(12) United States Patent
Borders et al.

(10) Patent No.: US 7,802,452 B2
(45) Date of Patent: Sep. 28, 2010

(54) PROCESSES FOR MAKING INORGANIC FIBERS

(75) Inventors: Harley Allen Borders, Highlands Ranch, CO (US); Michael R. Nijakowski, Whitehouse, OH (US); William J. Thome, Maumee, OH (US); Raymond L. McKenzie, Swanton, OH (US)

(73) Assignee: Johns Manville, Denver, CO (US)

( * ) Notice: Subject to any disclaimer, the term of this patent is extended or adjusted under 35 U.S.C. 154(b) by 1282 days.

(21) Appl. No.: 11/314,437

(22) Filed: Dec. 21, 2005

(65) Prior Publication Data

US 2007/0137259 A1 Jun. 21, 2007

(51) Int. Cl.
C03B 37/06 (2006.01)

(52) U.S. Cl. .................................................. 65/468

(58) Field of Classification Search ................. 65/462, 65/468, 500, 507, 508, 528, 531; 431/8–10, 431/12, 207–248
See application file for complete search history.

(56) References Cited

U.S. PATENT DOCUMENTS

| | | | |
|---|---|---|---|
| 1,923,942 A | 8/1933 | Lufkin | |
| 1,991,331 A | 2/1935 | Morton | |
| 1,999,762 A | 4/1935 | Howard | |
| 2,113,236 A | 10/1938 | Slayter et al. | |
| 2,234,986 A | 3/1941 | Slayter et al. | |
| 2,334,961 A | 11/1943 | Schoenlaub | |
| 2,681,863 A | 6/1954 | Croce et al. | |
| 2,744,022 A | 5/1956 | Croce et al. | |
| 2,925,620 A * | 2/1960 | Karlovitz et al. | 65/468 |
| 2,996,102 A | 8/1961 | Schuller | |
| 3,076,236 A | 2/1963 | Labino | |
| 3,174,527 A * | 3/1965 | Reed et al. | 431/181 |
| 3,736,094 A | 5/1973 | Shisler | |
| 3,837,832 A | 9/1974 | Decoraro et al. | |
| 3,954,382 A | 5/1976 | Hirose | |
| 4,167,404 A | 9/1979 | Loeffler et al. | |
| 4,168,959 A | 9/1979 | Loeffler | |
| 4,199,338 A * | 4/1980 | Levecque et al. | 65/527 |
| 4,414,010 A * | 11/1983 | Chin et al. | 65/527 |
| 4,481,024 A | 11/1984 | Bly | |
| 4,534,779 A | 8/1985 | Herschler | |
| 4,824,456 A * | 4/1989 | Schlachter | 65/479 |
| 4,889,546 A * | 12/1989 | Denniston | 65/464 |
| 5,006,141 A * | 4/1991 | Chen et al. | 65/27 |
| 5,154,746 A | 10/1992 | Okuma et al. | |
| 5,299,929 A | 4/1994 | Yap | |

(Continued)

OTHER PUBLICATIONS

PLUS Search Results for U.S. Appl. No. 11/314,436 Searched May 22, 2007.

(Continued)

*Primary Examiner*—Steven P Griffin
*Assistant Examiner*—Jodi Cohen
(74) *Attorney, Agent, or Firm*—Robert D. Touslee

(57) ABSTRACT

Inorganic fiber production processes and systems are disclosed. One process includes providing a molten inorganic fiberizable material, forming substantially vertical primary fibers from the molten material, and attenuating the primary fibers using an oxy-fuel fiberization burner. Other processes include forming a composition comprising combustion gases, aspirated air and inorganic fibers, and preheating a fuel stream and/or an oxidant stream prior to combustion in a fiberization burner using heat developed during the process. Flame temperature of fiberization burners may be controlled by monitoring various burner parameters.

20 Claims, 10 Drawing Sheets

U.S. PATENT DOCUMENTS

| | | | |
|---|---|---|---|
| 5,360,171 A | 11/1994 | Yap | |
| 5,401,588 A | 3/1995 | Garvey et al. | |
| 5,452,496 A | 9/1995 | Long et al. | |
| 5,455,991 A * | 10/1995 | Long et al. | 19/308 |
| 5,545,031 A | 8/1996 | Joshi et al. | |
| 5,554,324 A | 9/1996 | Bernard et al. | |
| 5,575,637 A | 11/1996 | Slavejkov | |
| 5,585,180 A | 12/1996 | Fadell | |
| 5,588,976 A | 12/1996 | Miller | |
| 5,601,228 A | 2/1997 | Fukunaga et al. | |
| 5,639,291 A * | 6/1997 | Kielmeyer et al. | 65/438 |
| 5,724,901 A | 3/1998 | Chaouki et al. | |
| 5,725,366 A * | 3/1998 | Khinkis et al. | 431/10 |
| 5,743,723 A | 4/1998 | Iatrides et al. | |
| 5,829,962 A | 11/1998 | Drasek et al. | |
| 5,833,447 A | 11/1998 | Bodelin et al. | |
| 5,882,184 A | 3/1999 | Feldermann | |
| 5,900,037 A | 5/1999 | Yang et al. | |
| 5,954,498 A | 9/1999 | Joshi et al. | |
| 5,955,011 A * | 9/1999 | Clocksin et al. | 264/6 |
| 5,970,752 A * | 10/1999 | Cusick et al. | 65/500 |
| 5,975,886 A | 11/1999 | Philippe | |
| 5,984,667 A | 11/1999 | Philippe et al. | |
| 6,068,468 A | 5/2000 | Philippe et al. | |
| 6,071,116 A | 6/2000 | Philippe et al. | |
| 6,074,197 A | 6/2000 | Philippe | |
| 6,113,389 A | 9/2000 | Joshi et al. | |
| 6,123,542 A | 9/2000 | Joshi et al. | |
| 6,126,438 A * | 10/2000 | Joshi et al. | 431/161 |
| 6,141,992 A | 11/2000 | Gross et al. | |
| 6,155,818 A | 12/2000 | Joshi et al. | |
| 6,171,100 B1 | 1/2001 | Joshi et al. | |
| 6,210,151 B1 | 4/2001 | Joshi et al. | |
| 6,247,315 B1 | 6/2001 | Marin et al. | |
| 6,250,916 B1 | 6/2001 | Philippe et al. | |
| 6,264,466 B1 | 7/2001 | Joshi et al. | |
| 6,273,180 B1 | 8/2001 | Joshi et al. | |
| 6,276,924 B1 | 8/2001 | Joshi et al. | |
| 6,276,928 B1 | 8/2001 | Joshi et al. | |
| 6,398,547 B1 * | 6/2002 | Joshi et al. | 432/54 |
| 6,584,809 B1 | 7/2003 | Gross et al. | |
| 6,652,265 B2 | 11/2003 | Cain | |
| 6,659,762 B2 * | 12/2003 | Borders et al. | 431/8 |
| 6,783,357 B2 * | 8/2004 | Joshi et al. | 431/161 |
| 6,883,721 B2 | 4/2005 | Marin et al. | |

OTHER PUBLICATIONS

EAST Search History for U.S. Appl. No. 11/314,436, May 23, 2007.

* cited by examiner

PROCESSES FOR MAKING INORGANIC FIBERS

BACKGROUND OF THE INVENTION

1. Field of Invention

The present invention relates generally to the field of inorganic fiber production and systems, and more specifically to heat exchange and control strategies useful in flame attenuation fiberization processes producing inorganic microfibers and other fibers.

2. Related Art

One process for manufacturing fine diameter mineral fibers, e.g. discrete length, glass fibers typically ranging from about 0.2 microns to about 7.0 microns in diameter, is the flame attenuation process. In this process, an electrically or gas flame heated pot or melter containing a molten fiberizable material such as glass batch materials or preformed marbles are melted and drawn from a plurality of outlet orifices of a bushing to form continuous primary filaments. The primary continuous filaments are drawn from the heated pot or melter by pull rolls which also function to feed the continuous primary filaments into a high temperature, high energy, gas flame that further attenuates the continuous primary filaments and forms short length, fine diameter fibers from the continuous primary filaments. These attenuating burners have extremely high gas flow rates in order to stretch the filaments while they are heated so as to reduce their diameter. As the attenuated filaments cool below the melting temperature of the glass, these filaments are broken by the force of the attenuating blast into fibers within a predetermined range of lengths, this range being a function of the operational parameters and the configuration of the attenuation zone. A filament guide with a plurality of grooves therein, guides and supports the continuous primary filaments into the flame so that the continuous primary filaments can be introduced into the flame at a specific location without being blown haphazardly about by the flame. The discrete length, fine diameter fibers, thus formed, are generally collected to form a fibrous blanket with the fibers randomly oriented within the blanket.

Energy costs continue to increase, spurring efforts to find ways to reduce the amount of fuel in mineral fiber manufacturing. The high velocity attenuation blast entrains cooler air from its surroundings. This low energy, low velocity air is mixed with the attenuation stream thereby diluting it and reducing both its temperature and velocity. The capability of the attenuating apparatus to reduce fiber diameter (i.e., to improve the filtration or insulating capabilities of the material) is hampered by this unrestricted stream dilution. To offset the disadvantages of dilution, more gas must be burned to produce higher temperatures. Fiberization process operators have resorted to restricting dilution by providing a shroud around the attenuation region which limits the entrainment of dilution air by restricting the access of the surroundings to the region. The shroud also confines the heat thereby increasing the temperature in the attenuation zone. Several openings are provided in the shroud to permit a restricted amount of dilution air to be beneficially entrained by the attenuation stream. The dilution air from at least one of the openings may be provided with a preheater which uses waste heat rising from the attenuating burner to heat the air. The position of the stream of gases can also be adjusted within the shroud by adjusting the amount of air inspirated above and below the centerline of the blast or stream. The inspirated air stream may be directed to create turbulence in the combined stream, causing the primary filaments to adopt a serpentine path within the attenuation zone which increases the length of time each primary is exposed to the heat of the attenuation zone and thereby improves fiber attenuation (i.e., reduces fiber diameter).

Despite these advances in the art, there is still a need for further energy efficiency in mineral fiberization processes. Because of the tremendous amounts energy required in glass tank furnaces, steel blast furnaces, and rotary furnaces, combined with regulations limiting the amount of NOx and SOx emissions, operators in those industries have used oxygen-enriched air to decrease energy usage and emissions. These tend to be very high temperature processes (at least, 820° C., 1500° F.). In very high temperature processes in large furnaces, $NO_x$ formation is promoted by long residence times of oxygen and nitrogen molecules in hot regions of the flame and the furnace. The use of substantially pure oxygen (about 90% $O_2$ or higher) instead of air as the oxidant has proven to be very successful in reducing the $NO_x$ emissions by as much as 90%, since all nitrogen is eliminated. However; substitution of air by substantially pure oxygen increases the flame temperature, and thus creates regions in the larger furnaces where the reactivity of nitrogen with oxygen is high, and wherein the formation of $NO_x$ may proportionally increase, even though it is globally decreased when compared to combustion with air. Use has been made of regenerative and recuperative furnaces in the aforementioned industries to recover some of the heat in the high temperature effluent gases. Regenerative glass tank furnaces use hot combustion gases that otherwise would be vented to the atmosphere to heat an intermediate heat transfer material, such as ceramic balls held in towers. Typically two towers are used, so that one tower is heated by combustion gases while the other tower has air flowing there through to preheat the combustion air before entering burners. The towers are switched in cyclic fashion. Recuperative glass tank furnaces preheat combustion air using heat exchange between cool air and combustion gases. In addition to air preheating, commercial grade oxygen and oxygen-enriched air may be preheated employing direct or indirect heat exchange (through one or more heat exchange fluids, such as an inert gas) using specially designed heat exchangers. However, none of these techniques, despite their being available for sometime, have ever been used in mineral fiberization processes and systems. This may be due to any of a variety of factors. Not only are the fields of use quite different, but the nature of the molten material and equipment being different (fibers vs. large pools of molten material, usage of burners to attenuate fibers vs. usage of burners for melting) leads to very different problems to be solved, despite the fact that decreased energy usage is a common goal of many industries, including both the float glass and mineral fiber industries. As the end use of mineral fibers depends on the physical properties of the fibers, such as their ability to be dispersed in liquids and slurries, or their ability to function as filter media or insulation, producers are careful not to change a process that produces acceptable fibers for a small decrease in energy consumption.

Because of this it would be an advance in the fiberization art to reduce energy requirements a significant amount in mineral fiberization processes to make their implementation attractive, particularly in situations where the fiber physical properties are acceptable, or even better than acceptable, in terms of higher quality fibers and products employing the fibers, such as filtration and insulation products.

SUMMARY OF THE INVENTION

In accordance with the present invention, processes and systems are described that unexpectedly produce better quality fibers than previously known fiberization processes and systems. By controlling burner flame temperature and/or other burner operating parameters of oxy-fuel fiberization burners, processes and systems of the invention allow production of inorganic fibers having greater average strength and length while reducing or eliminating shot compared to conventional air-fuel fiberization burners that do not use an oxygen-enriched oxidant. In certain embodiments, for example when oxygen is not available, or available but too expensive, processes and systems are described employing preheating air and/or fuel with auxiliary heat sources such as electrical resistance elements, coal-fired high pressure steam, and the like. One goal of processes and systems of the invention is to elevate the combustion gas temperature, or flame temperature, leaving the burner. Energy economics may dictate using these alternatives in lieu of oxygen. When an oxygen-enriched oxidant is employed, heat recovery techniques may also be used as the oxy-fuel flame temperatures are higher than air-fuel flame temperatures.

A first aspect of the invention are processes of making fibers, one process comprising:
 (a) providing a molten inorganic fiberizable material;
 (b) forming one or more substantially vertical primary fibers from the molten material; and
 (c) attenuating the primary fibers using a flame of an oxy-fuel burner.

If oxygen or an oxygen-enriched oxidant is not available, the air and/or fuel entering the burner may be preheated using heat recovery techniques (capturing some of the heat otherwise wasted in the process) or through use of auxiliary heating means, thereby increasing flame temperature. Processes of the invention include those wherein the oxy-fuel burner produces a jet of hot combustion gases or flame to attenuate the primary fibers. The combustion gases combine with aspirated air and in attenuated fibers to form a composition, and substantially all of the attenuated inorganic fibers are separated from the composition to form an effluent gas stream comprising the combustion gases and aspirated excess air. Processes of the invention include those wherein either the fuel and/or one or more oxidants is preheated by exchanging heat with at least a portion of the effluent gas stream. Other processes of the invention are those wherein the preheating comprises exchanging heat with at least a portion of the composition comprising combustion gases, aspirated air and inorganic fibers, as would be present in a fiber collection chamber, which may be a cylindrical or other shaped chute downstream of the burner and where aspirated or entrained air is used to cool the fibers. Process of the invention include those wherein a primary oxidant (for example air) and fuel are premixed prior to being combusted in the burner, and a secondary oxidant enriched with oxygen is also used in the oxy-fuel burner. Other processes of the invention include those wherein the primary oxidant and the fuel are mixed in situ in the burner. The primary oxidant may be selected from air, oxygen-enriched air, and industrial grade oxygen. Processes of the invention include those wherein a secondary oxidant is injected into the burner, wherein the secondary oxidant may be any grade of oxygen, such as industrial grade oxygen produced cryogenically, by adsorption processes, or membrane processes. The primary oxidant may be compressed prior to combusting with the fuel in the burner. For example, the primary oxidant may be air and the preheating may comprise exchanging heat with at least a portion of the composition prior to compressing the air. A secondary oxidant may be injected into the primary oxidant before or after compressing the primary oxidant. Alternatively, the primary oxidant may be air and the preheating may comprise exchanging heat with at least a portion of the effluent gas stream prior to compressing the air. Other processes of the invention are those wherein a secondary oxidant may be injected into the primary oxidant before or after compressing the primary oxidant. Yet other processes of the invention are those wherein a secondary oxidant is combined with the primary oxidant to form a tertiary oxidant prior to combustion of the fuel in the burner. The tertiary oxidant may be preheated, as well as the optionally the fuel, prior to combustion of the fuel with tertiary oxidant. Yet another alternative process of the invention is lancing a secondary oxidant into the combustion gases emanating from the burner, prior to the combustion gases aspirating air in the collection chamber.

All process embodiments of the invention may be controlled by one or more controllers. For example, fiberization burner flame temperature may be controlled by monitoring one or more parameters selected from velocity of the fuel, velocity of one or more oxidants, mass flow rate of the fuel, mass flow rate of one or more oxidants, energy content of the fuel, temperature of the fuel as it enters the burner, temperature of the oxidant as it enters the burner, temperature of the effluent, pressure of the oxidant entering the burner, humidity of the oxidant, burner geometry, combustion ratio, and combinations thereof. Other processes of the invention may employ a heat transfer fluid, such as an inorganic, substantially inert gas, such as nitrogen, argon, helium, non-combustible mixtures of hydrogen and helium, and the like. The heat transfer fluid may first pick up heat from the effluent gas stream or the composition comprising combustion gases, inspirated air, and fibers, and give up its heat in one or more heat exchangers to one or more of the fuel, primary oxidant, secondary oxidant, or tertiary oxidant.

Another aspect of the invention are systems, one system comprising:
 (a) an assembly comprising a molten inorganic fiberizable material container, and a bushing for forming substantially vertical primary fibers from the molten material; and
 (b) an oxy-fuel burner for attenuating the primary fibers.

Certain systems of the invention may include heat recovery or auxiliary heating means for preheating air and/or fuel if an oxygen-enriched oxidant is not available. Systems of the invention include those comprising a compressor for compressing a primary oxidant, systems comprising means for injecting a secondary oxidant enriched in oxygen into the burner or into the primary oxidant, typically a pipe or double-barreled pipe having coolant in the annulus between pipes. Other systems of the invention include those wherein a heat exchanger is employed, which may be a gas to gas heat exchanger adapted to exchange heat between an effluent stream and streams selected from the fuel, the primary oxidant, the secondary oxidant, and a mixture of primary and secondary oxidants. Certain systems of the invention include a gas to gas heat exchanger adapted to exchange heat between an effluent stream and streams selected from the fuel, the primary oxidant, and both the fuel and primary oxidant. Exemplary systems of the invention comprise a combustion controller which receives on or more input parameters selected from velocity of the fuel, velocity of one or more oxidants, mass flow rate of the fuel, mass flow rate of one or more oxidants, energy content of the fuel, temperature of the fuel as it enters the burner, temperatures of the oxidants as they enter the burner, pressures of the oxidants entering the burner, humidity of the oxidants, burner geometry, oxidation ratio, temperature of the effluent and combinations thereof, and employs a control algorithm to control combustion temperature based on one or more of these input parameters.

Processes and systems of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
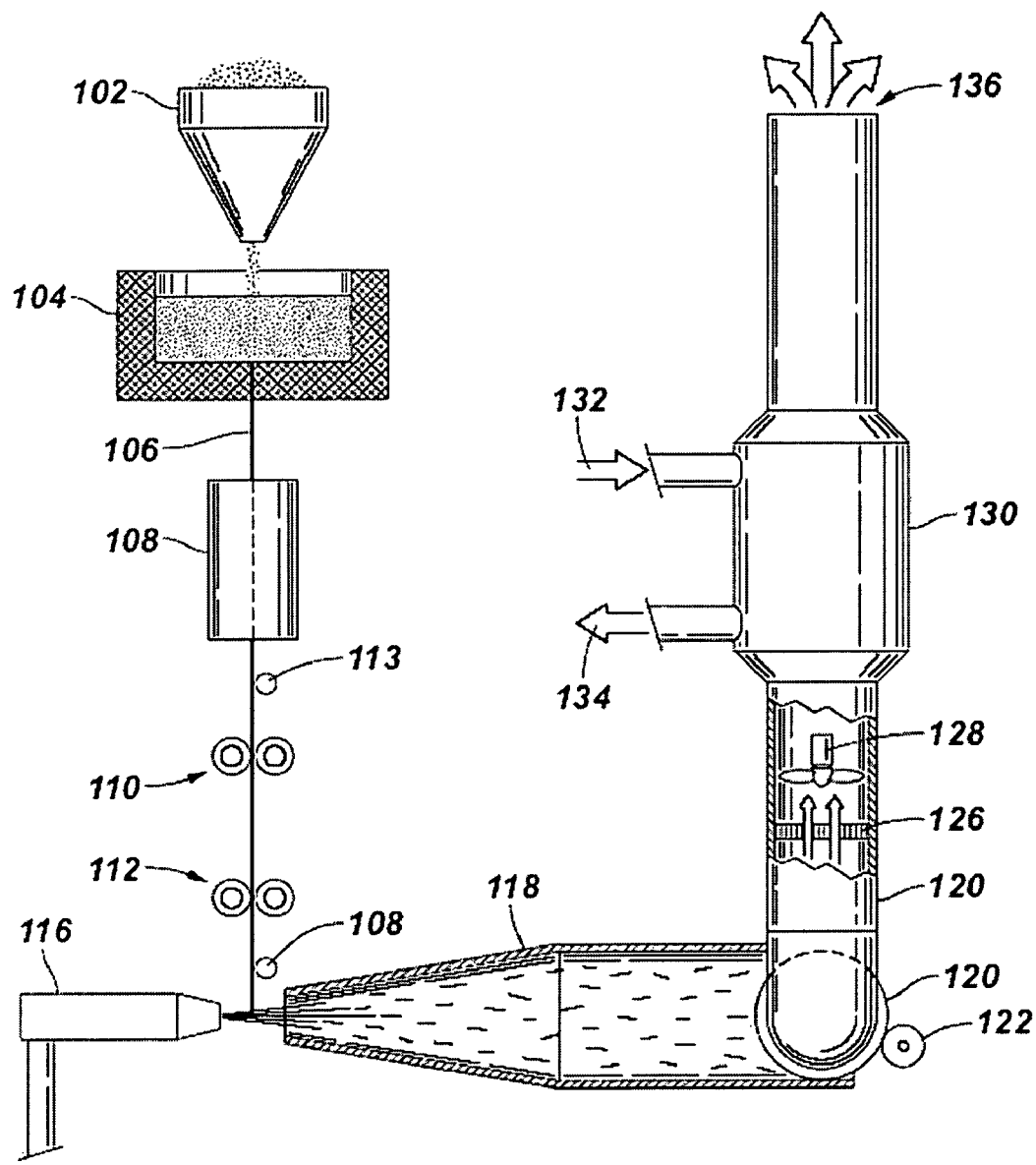
FIG. 1 is a schematic process flow diagram of a prior art fiberization process that may benefit from the improvements presented by the present invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes inorganic material fiberization processes and systems. Although the invention is not limited to so-called "microfiber" production processes and systems, it is helpful to define the term as a starting point. As used herein, "microfibers" are defined as fibers having a mean diameter ranging from about 0.05 to about 3.5 micrometers, more typically from about 0.1 to about 1.0 micrometers. Microfibers produced by processes and systems of the invention may have a length to diameter ratio of at least about 5:1 and more usually from about 3000:1 to about 10:1. The length to diameter ratio of the microfibers most often averages from about 10:1 to about 2000:1. The average length and diameter of the microfibers can be controlled by controlling the combustion process, and secondarily by the composition and flow rate of the molten inorganic material being fiberized. Generally, microfibers produced using processes and systems of the invention have an average length of less than about 0.05 inches. Normally, the microfibers have an average length ranging from about 1 to about 500 micrometers, more usually ranging from about 10 to about 300 micrometers, and most often the fiber length averages from about 25 to about 50 micrometers. Procedures for determining the average diameters and lengths of particular batches of microfibers are well known to those skilled in the art and need not be repeated.

"Fiberization" is used as a verb unless otherwise noted, and means forming short fibers, which may or may not be microfibers, from a primary, relatively continuous fiber using a hot blast process modified in accordance with the invention, where hot combustion gases attenuate the primary fiber, and aspirated air is used to cool the attenuated fibers and cause the attenuated primary fibers to break into short, staple fibers.

Given that safety, decreased energy consumption, production capacity, and fiber physical properties are primary concerns, and that there is considerable investment in existing equipment, it would be an advance in the art if existing fiberization systems and processes could be modified to increase safety, energy efficiency, productivity, and product quality, or new systems designed for these purposes whose capital outlay would be returned quickly through energy efficiency and increased sales of product. This invention offers processes and systems for these purposes.

Referring now to the figures, FIG. 1 is a schematic process flow diagram of a prior art air-fuel fiberization process that may benefit from the systems and methods of the invention. Glass marbles are transported to a distribution hopper 102 and then into a heated pot 104, which then melts the marbles into molten glass. Marbles may be transported to feed hopper 102 with a distribution manifold to a plurality of heated pots 104, the feed rate to heated pots 104 being a function of pot temperature and roller 110 rpm. Heated pot 104, sometimes referred to as the marble pot, may typically comprise a metallic cylinder heated with a heating jacket using premixed natural gas burners on its side walls. The bottom of marble pot 104 may be formed from a metal alloy comprising multiple holes ranging from about 0.05 inch to 0.5 inch in diameter, depending on the glass fiber product being made, through which the molten glass is drawn into primary fibers 106 (only one primary fiber is shown). Primary fiber 106 may be pulled and directed by rollers 112 and 114 and by fiber guides 113 and 114 through a heat containment shield 108. Shield 108 may extend in space between the bottom of marble pot 104 to the top of the first set of rollers 110, and functions to control the cooling rate of the primary fiber. The objective is to keep the primary fiber as hot as possible without damaging roller pad material in the rollers. In addition to the heat shield, heat sources, such as infrared sources may be placed in the spaces before rollers 110 and 112 or after the rollers.

A fiberization burner 116 functions to produce a hot flame at a controlled temperature, velocity, and oxidation state in the systems and methods of the invention. The glass fiber product to be manufactured is a function of the mass flow rate of the glass, the primary glass fiber diameter, the flame temperature produced by burner 116, the slot size and pressure inside of burner 116, and the product code fiber diameter. Benefits of using oxygen or oxygen-enriched air as an oxidant in fiberization burners include the higher flame temperature fiberization, which leads to increased fiber tensile strength, longer fibers, and reduce production or elimination of shot, or looser process control to avoid producing shot. Fluctuations in humidity are reduced, and variation in fiber quality is reduced.

In both the prior art process depicted in FIG. 1 and the systems and processes of the invention, a collection chamber 118 comprising a generally cylindrical chute collects short fibers and entrains air into chamber 118 to rapidly cool the molten fibers. The fiber are then routed to a larger section of chamber 118 where at the far end a fiber pickup drum 120 collects the fibers, where a secondary fiber pickup apparatus 122, such as vacuum ducting or a roller, removes the fibers. Pickup drum 120 is typically a rotating perforated steel cylinder with a filter material suitable for collecting fibers secured to the outer surface of the cylinder, with aide of negative pressure on the inside of drum 120. Combustion gases, any particulates, and excess air (in the prior art process, and in addition excess oxygen in systems and methods of the invention) pass through drum 120 through ducting 124 and flow through a particulate removal device 126, with aide of an exhaust fan 128. A heat exchanger 130 may be used to cool exhaust gases, which exit to atmosphere at 136. In prior art system and methods using air-fuel combustion, cool air 132 is used to cool the exhaust, resulting in warmed air 134 of low grade heat content, largely unusable in heat recovery. However, with the higher temperatures experienced in oxy-fuel combustion of the invention, this heat may be recovered and used in various ways, as further explained herein.

Figure 2:
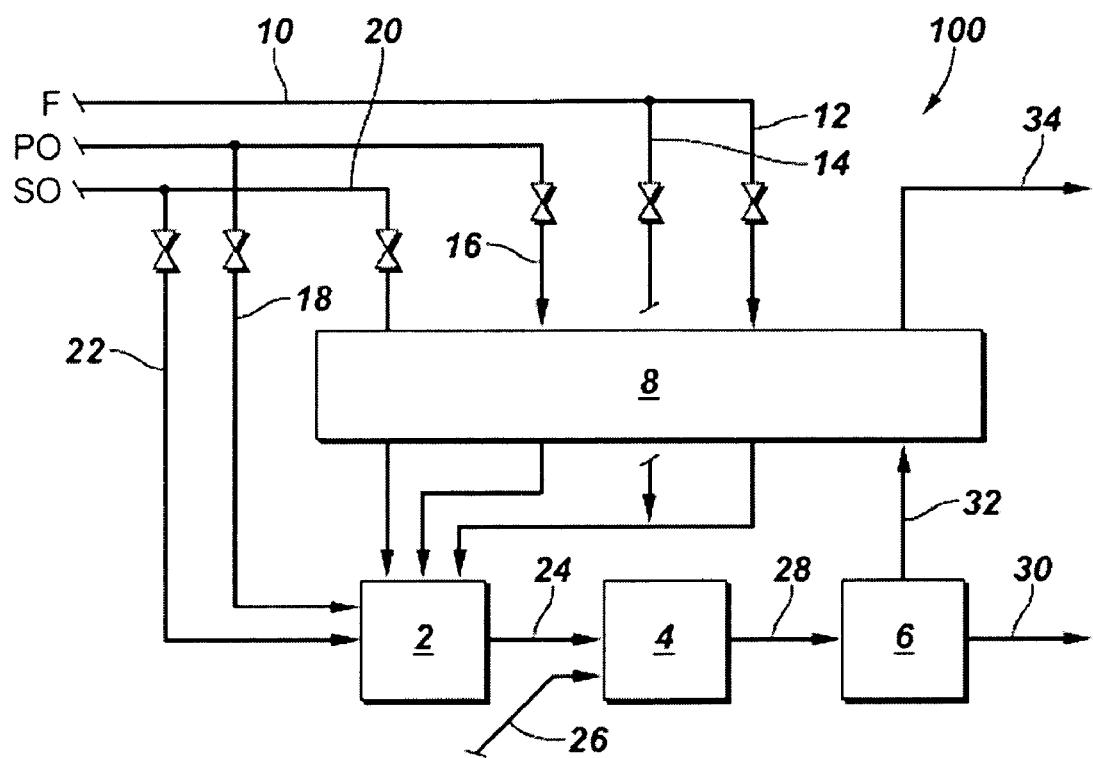
FIGS. 2-5 are schematic block diagrammatical views of four non-limiting systems and processes in accordance with the invention.

In light of the higher fiberization burner flame temperatures involved when using oxy-fuel fiberization burners (from about 2200 to about 3200° F. as opposed to 1900° F. for air-fuel fiberization flame temperatures), opportunities exist also for heat recovery and energy savings. FIGS. 2-5 are schematic block diagrammatical views of four non-limiting systems and processes in accordance with the invention. FIG. 2 illustrates a system and process embodiment 100 where a hot effluent stream may be used to preheat fuel, primary oxidant (for example, air), and/or secondary oxidant (for example oxygen or oxygen-enriched air). Embodiment 100 includes one or more fiberization burners 2, a collection unit 4, a fiber separation unit 6, and a heat exchanger 8. Fiberization burner 2 burns a fuel F which may arrive at burner 2 through conduit 10, 12, and/or 14, using a primary oxidant PO which may arrive through conduit 16 and/or 18, and may receive a secondary oxidant SO through conduit 20 and/or 22. Combustion gases leave burner 2 as indicated by a conduit 24, but the invention is not so limited, as there may not be significant space between burner 2 and collection unit 4. Air 26 is inspirated into collection unit 4 to cool attenuated fibers coming from burner 2. Air 26 may be ambient air or non-ambient air, such as chilled or heated air. A composition comprising combustion gases, inspirated air, and fibers leaves collection unit 4, as indicated by a conduit 28, to fiber separation unit 6. Once again, although the composition is illustrated traversing to fiber separation unit 6 through a conduit 28, the invention is not so limited, and this is for illustration purposes only to indicate the general direction of movement of compositions through the system. Fiber separation unit separates stream 28 into a fiber stream 30 and a hot effluent stream 32 using known means. Hot effluent stream 32 transfers some of its heat to one or more of the fuel, primary oxidant, and secondary oxidant streams in heat exchanger 8, and then exits as a cooled effluent stream 34. In certain embodiments of the invention, hot effluent stream 32 maybe separated into multiple streams entering heat exchanger 8. Similarly, cool effluent stream 34 may be a composite of multiple cool effluent streams exiting heat exchanger 8. The details depend on the specific heat transfer load and design of heat exchanger 8, as chosen by the engineer. Suitable valving, some of which is indicated in FIG. 2, may be employed to direct all, some, or none of a particular stream through heat exchanger 8. If more than two of fuel, primary oxidant, and secondary oxidant are to gain heat from the hot effluent stream, heat exchanger design will be dictated to be either separate units, or one unit having suitable compartments, gaskets, and the like, to prevent premature mixing of oxidant and fuel, or of primary oxidant and secondary oxidant, as desired. Other units maybe added to this system and process with diverging from the invention, such as a particulate recovery unit in stream 32. Furthermore, the flow of solid material is not illustrated, and the system would include fiber precursor holding tanks, such as feed hoppers, marble pots, heat containment equipment, primary fiber guides and rollers, and the like, the descriptions of which are fairly well known to those of ordinary skill in the inorganic fiberization art as to require no further explanation.

Figure 3:
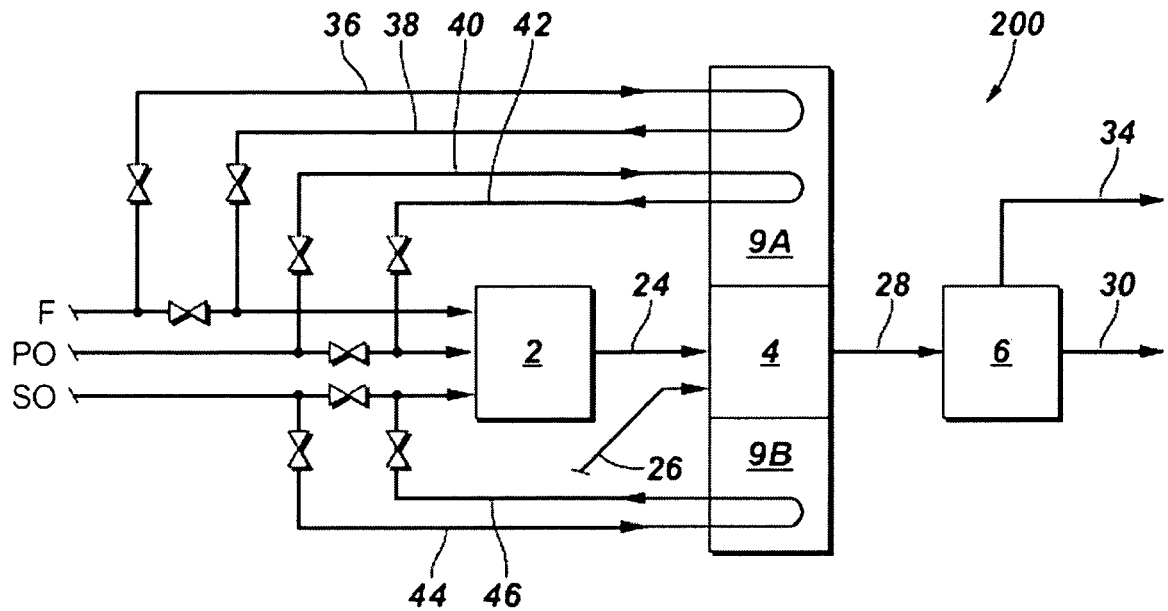

FIG. 3 illustrates an embodiment 200 wherein heat from the composition comprising fibers, combustion gases, and inspirated air is employed to preheat fuel, primary oxidant, and/or secondary oxidant. The same reference numerals are used in the various embodiments to refer to identical components. Embodiment 200 also includes one or more fiberization burners 2, a collection unit 4, and a fiber separation unit 6, however in embodiment 200, the heat exchanger 8 of embodiment 100 of FIG. 2 is replaced with one or more heats exchangers 9A and 9B, illustrated in FIG. 3 as comprising shells of heat exchangers. Fuel F may be routed through conduit 36 to heat exchanger 9A, and return as preheated fuel in conduit 38, and then be routed to burner 2. Similarly, or alternatively, primary oxidant may be routed through a conduit 40 to heat exchanger 9A and return as preheated primary oxidant in a conduit 42 and be routed into burner 2, and a secondary oxidant may be routed through a conduit 44 to heat exchanger 9B and return as preheated secondary oxidant in a conduit 46 and be routed to burner 2.

In certain other embodiments of the invention, not illustrated in the figures, combinations of embodiments 100 and 200 of FIGS. 2 and 3, respectively, may be employed. For example, primary oxidant could be preheated by heat exchange with hot effluent gases as depicted generally in FIG. 2, while fuel could be preheated by heat exchange with the equipment illustrated in FIG. 3. All of these various systems and processes and their equivalents are consider within the present invention.

Figure 4:
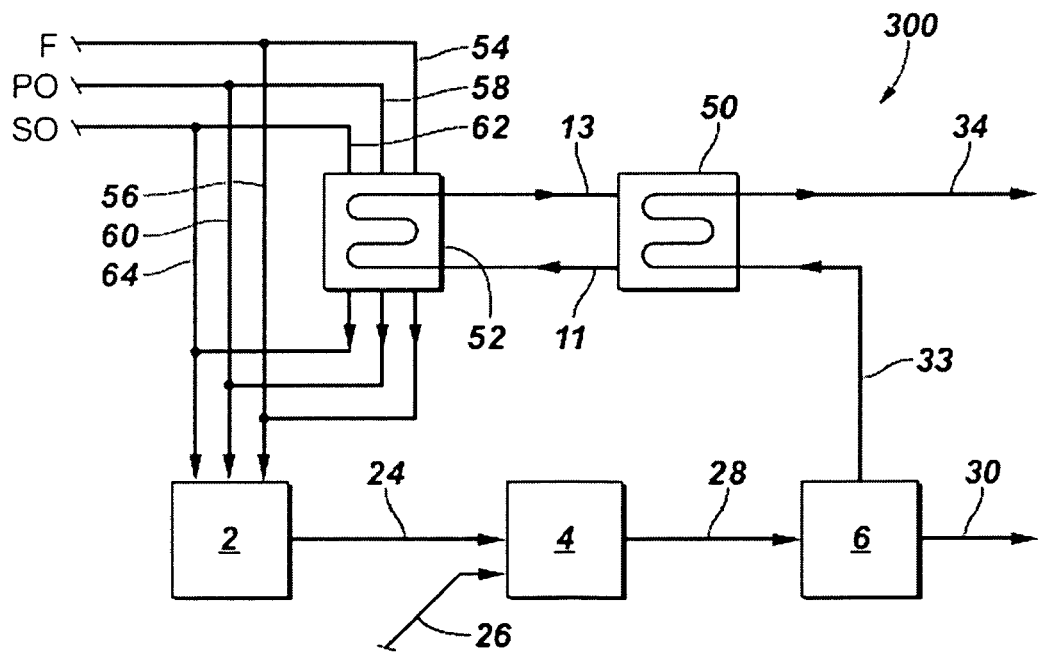
Figure 5:
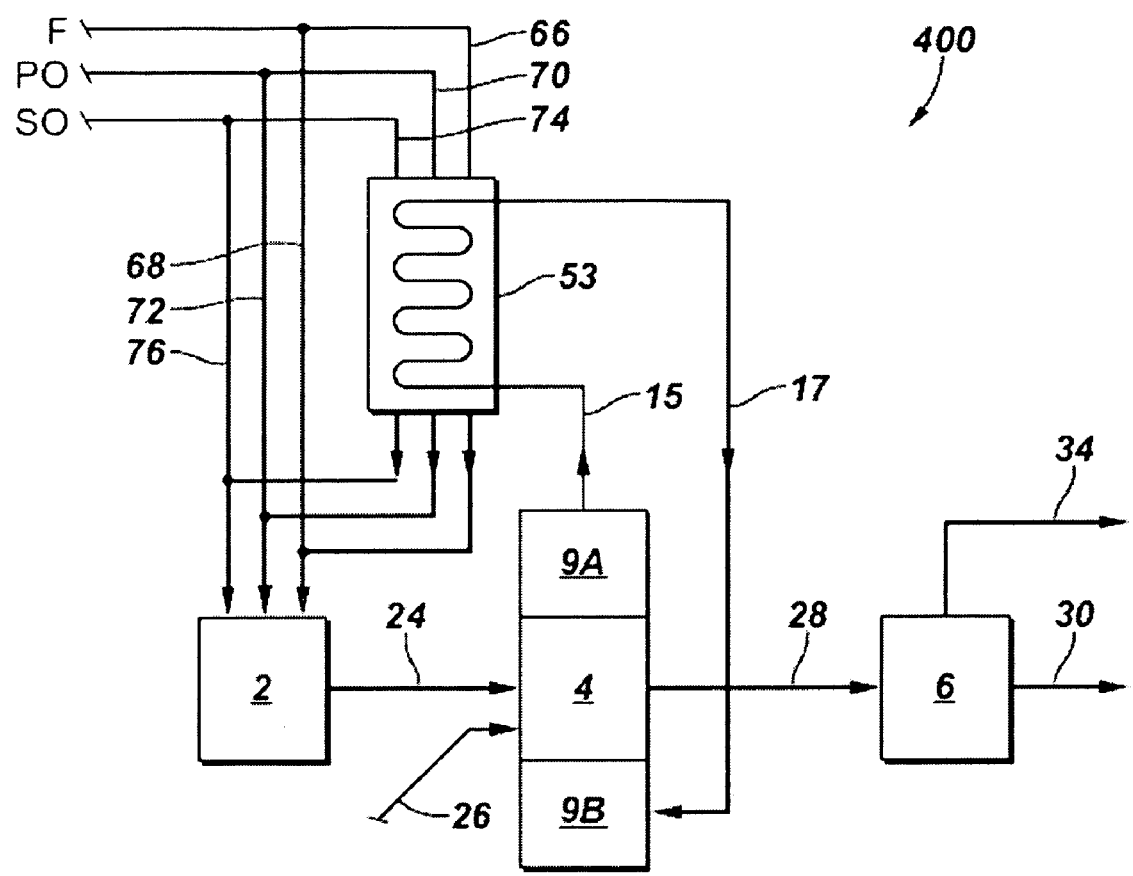

FIGS. 4 and 5 illustrate two non-limiting embodiments wherein an intermediate heat transfer fluid may be used to accept heat from a hot stream, and then transfer some of that heat to a fuel and/or oxidant stream. FIG. 4 illustrates an embodiment 300 that is somewhat similar to embodiment 100 of FIG. 2, however, a hot effluent stream 33 passes through a heat exchanger 50 to transfer some of its heat to a cool heat transfer fluid entering heat exchanger 50, for example via a conduit 13. A warm heat transfer fluid leaves heat exchanger 50, for example via a conduit 11, which continues on to another heat exchanger 52 to exchange heat with fuel entering through conduit 54, primary oxidant through conduit 58, and/or secondary oxidant 62. For clarity, various valves are not shown, but those of skill in the art will realize that some, all, or none of each stream (fuel, primary oxidant, and secondary oxidant) need be preheated in any given operation. Non-preheated fuel, primary oxidant, and secondary oxidant may be routed directly to burner 2 through conduits 56, 60, and 64, for example. Furthermore, heat exchangers 50 and 52 may be a single unit, or multiple units, and may be arranged in series or parallel as desired for any particular case. Conduits may be added or deleted in accordance with the particular embodiment in question, heat transfer load, production quotas, and the like. Safety relief vales are not illustrated, but would be included in many of the streams, for example in conduit 13 transporting heated heat transfer fluid.

FIG. 5 illustrates an embodiment 400 that is somewhat similar to embodiment 200 of FIG. 2, however, a warm heat transfer fluid stream 15, having picked up heat from combustion gases, inspirated air and fibers in heat exchangers 9A and 9B, is routed through a heat exchanger 53 to preheat a cool fuel stream 66, a cool primary oxidant stream 70, and/or a cool secondary oxidant stream 74. A cooled heat transfer fluid leaves heat exchanger 53 via a conduit 17 and returns to heat exchangers 9A and 9B to complete the cycle. Once again, for clarity, various valves are not shown, but those of skill in the art will realize that some, all, or none of each stream (fuel, primary oxidant, and secondary oxidant) need be preheated in any given operation. Non-preheat fuel, primary oxidant, and secondary oxidant may be routed directly to burner 2 through conduits 68, 72, and 76, for example. Furthermore, heat exchangers 53, 9A and 9B may be single units, or multiple units, and may be arranged in series or parallel as desired for any particular case. Safety relief vales are not illustrated, but would be included in many of the streams, for example in conduit 17 transporting heated heat transfer fluid.

The heat transfer fluid used may be any gaseous, liquid, or some combination of gaseous and liquid composition that functions or is capable of being modified to function as a heat transfer fluid. Gaseous heat transfer fluids may be selected from inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen, and inert liquids which may be organic, inorganic, or some combination thereof, for example, salt solutions, glycol solutions, and the like. Other possible heat transfer fluids include steam, carbon dioxide, or mixtures thereof with nitrogen.

Any combination of processes and systems of FIGS. 4 and 5 may be envisioned, and indeed any combination of processes and systems of FIGS. 2-5, as may be desired. More heat transfer equipment will entail increased capital expenditure, which, however will be offset by decreased energy usage. Detailed but routine calculations may be performed to determine the most cost effective process and system.

Figure 16:
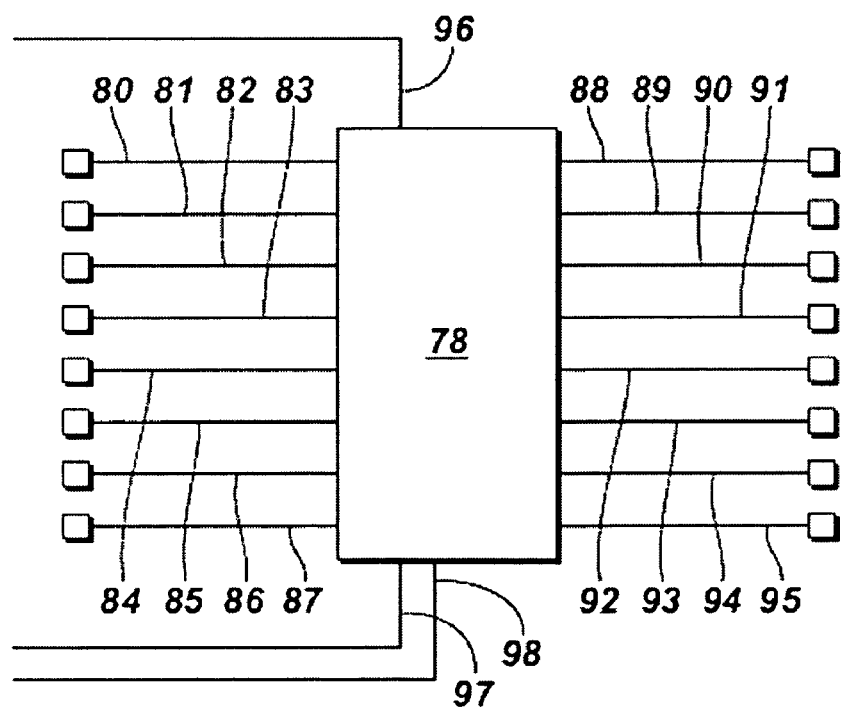
FIG. 16 is a schematic block diagram of a combustion process control scheme in accordance with the invention.

FIG. 16 is a schematic block diagram of one non-limiting combustion process control scheme in accordance with the invention. A master controller 78 is shown, but the invention is not so limited, as any combination of controllers could be used. The controller may be selected from PI controllers, PID controllers (including any known or reasonably foreseeable variations of these), and computes a residual equal to a difference between a measured value and a set point to produce an output to one or more control elements. The controller may compute the residual continuously or non-continuously. Other possible implementations of the invention are those wherein the controller comprises more specialized control strategies, such as strategies selected from feed forward, cascade control, internal feedback loops, model predictive control, neural networks, and Kalman filtering techniques. In FIG. 16, the lines and boxes numbered 80-87 may represent sensors, for example sensors for the following parameters, which are merely exemplary examples:

80=$V_{fuel}$, velocity of fuel entering burner;
81=$V_{PO}$, velocity of primary oxidant entering burner;
82=$V_{SO}$, velocity of secondary oxidant entering burner;
83=$M_{fuel}$, mass flow rate of fuel entering burner;
84=$M_{PO}$, mass flow rate of primary oxidant entering burner;
85=$T_{fuel}$, temperature of fuel entering burner;
87=$T_{PO}$, temperature of primary oxidant entering burner;
88=$P_{PO}$, pressure of primary oxidant entering burner;
89=$H_{PO}$; humidity of primary oxidant.

The lines and boxes numbered 88-95 may represent control signals and actuators, respectively, for outputs for the following parameters, which are merely exemplary:

88=$V_{fuel}$, velocity of fuel entering burner;
89=$V_{PO}$, velocity of primary oxidant entering burner;
90=$M_{fuel}$, mass flow rate of fuel entering burner;
91=$M_{SO}$, mass flow rate of secondary oxidant entering burner;
92=$T_{fuel}$, temperature of fuel entering burner;
93=$T_{PO}$, temperature of primary oxidant entering burner;
94=$P_{SO}$, pressure of secondary oxidant entering burner;
95=$M_{EFF}$ (or $M_{HTF}$), mass flow rate of hot effluent (or heat transfer fluid).

Other parameters may be included as inputs, such as desired fiber diameter and/or length 96, burner geometry 97, and combustion ratio 98.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the invention.

Controllers useful in the systems and methods of the invention may vary in their details. One PID controller useful in the invention may be expressed mathematically as in Equation 1:

$$u(t)=Kp[e(t)+1/Ti \cdot \int e(t)dt+Td \cdot \dot{e}(t)] \quad (1)$$

wherein:

∫ means integrate;

ė(t) means the time derivative;

u(t) is controller output, which may be burner flame temperature, for example;

e(t) means difference between a desired and measured (real time) value;

Td is a constant for describing the derivative part of the algorithm (the derivative part may be filtered to avoid deriving high frequencies);

Ti is a constant for describing the integrating part of the algorithm; and

Kp is a proportional gain constant.

In the s-plane (Laplace), the PID controller may be expressed as (Equation 2):

$$Hr(s)=Kp[1+1/Tis+Tds/(1+Tfs)] \quad (2)$$

wherein:

s is the variable in the s-plane; and

Tf is a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form (Equation 3):

$$s=(1-z-1)/T \quad (3)$$

while the derivative part may be approximated using an Euler model (Equation 4):

$$s=2/T-(1-z-1)/(1+z-1) \quad (4)$$

wherein T is the sampling time.

The resulting discrete model may then be used directly in the combustion or burner control algorithm. Other discrete models, derived using other transforms, are useful in the invention, and will be apparent to control technicians or control engineers of ordinary skill.

The controller flay utilize Model Predictive Control (MPC). MPC is an advanced multivariable control method for use in multiple input/multiple output (MEMO) systems. An overview of industrial Model Predictive Control can be found in Camacho, E.F., and Bordons C. Model Predictive Control. 2nd Ed., Spinger. (2004) MPC computes a sequence of manipulated variable adjustments in order to optimise the future behavior of the process in question. At each control time k, MPC solves a dynamic optimization problem using a model of the controlled system, so as to optimize future behavior (at time k+1, k+2. . . k+n) over a prediction horizon n. This is again performed at time k+1, k+2. . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel, constraints, return on capital constraints, and the like. It may be difficult to explicitly state stability of an MPC control scheme, and in certain embodiments of the present invention it may be necessary to use nonlinear MPC. In so-called advanced control of various systems, MD control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

The feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Figure 6:
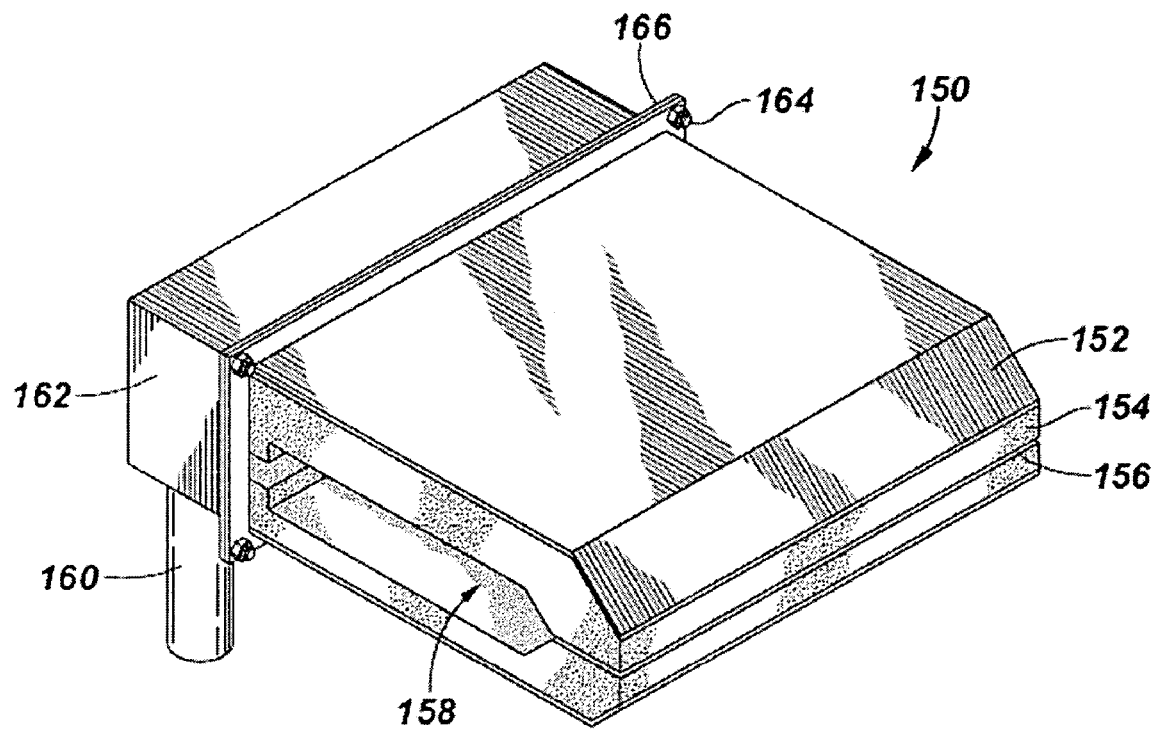
FIG. 6 is a perspective view of a prior art fiberization burner.

FIG. 6 is a perspective view of a prior art fiberization burner 150, having a stainless steel or other metallic shell 152, a refractory burner block 154 defining a burner slot 156 and a combustion chamber 158. An air-fuel mix manifold, 160 and 162 routes air and fuel, typically natural gas, to the combustion chamber 158. Manifold 160 and 162 is mounted to burner block 154 through mounting holes 164 (four typically) through flange 166.

Figure 7:
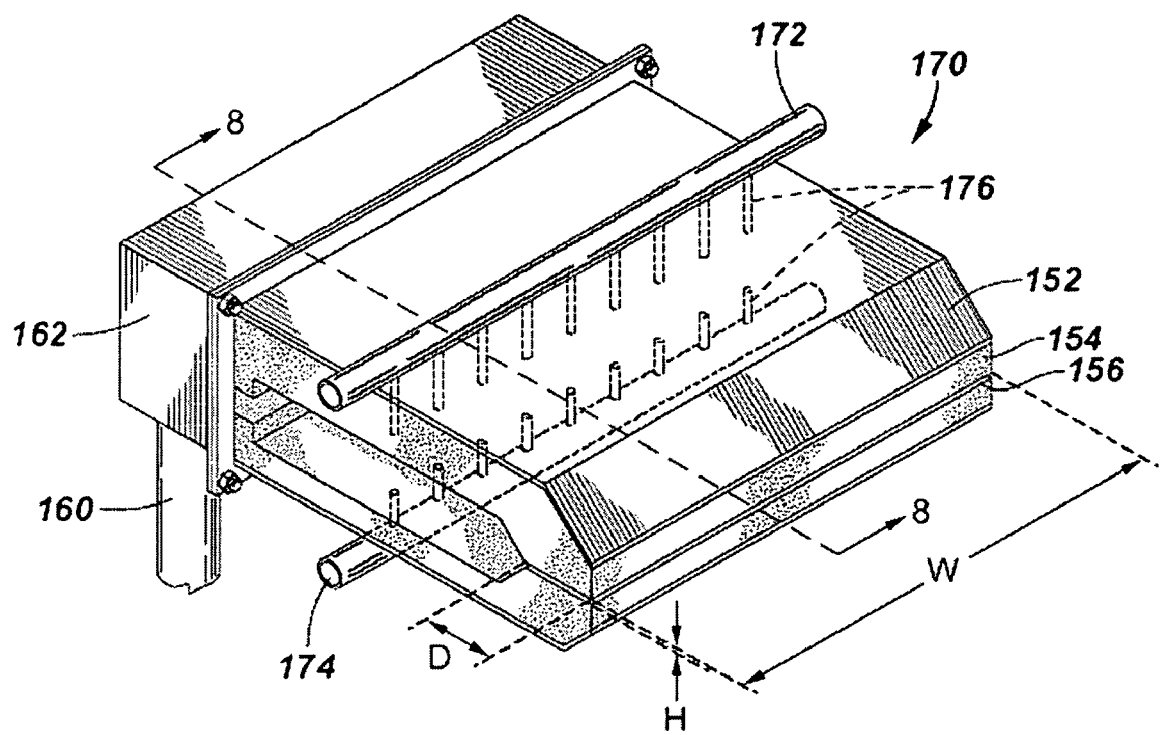
FIG. 7 is a perspective view of the fiberization burner of FIG. 6 modified to include non-cooled secondary oxidant injection.
Figure 8:
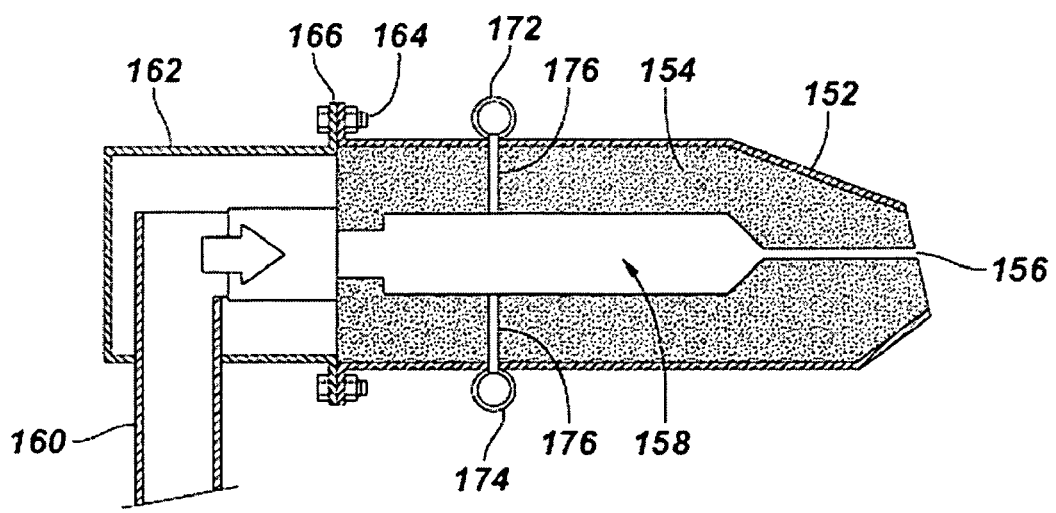
FIG. 8 is a cross-sectional view of the burner of FIG. 7 along 8-8.

FIG. 7 is a perspective view, and FIG. 8 is a cross-sectional view through section 8-8, of the fiberization burner of FIG. 6 modified to include non-cooled secondary oxidant injection in accordance with one burner useful in the present invention. Burner 170 includes two secondary oxidant manifolds 172 and 174, which may be stainless steel pipe or other alloy pipe, each having a series of holes therein for accepting a corresponding number of ceramic tubes 176 through which secondary oxidant is charged into combustion chamber 158.

In operation of fiberization burners useful in the invention, thin inorganic primary fibers are directed by means of guides and rollers into the flame produced by the fiberization burner. The mass flow rate of the inorganic material, for example glass, is a function of the primary fiber diameter, the flame temperature of the burner, the burner geometry, for example slot size of the burner, the pressure in the burner, and the product code fiber diameter. The process operating conditions are generally not independent values but have some degree of interaction. Oxygen-enhanced oxidant/fuel fiberization is markedly different than the traditional air-fuel fiberization process. The general principle is to operate combustion in the burner in a manner that replaces some of the air with a separate source of oxygen. The overall combustion ratio may not change. The process of combining fuel and oxygen-enriched oxidant will occur in the burner combustion chamber after the gases have passed over the flame arrestor safety device. The flame temperature of the combustion gases can be controlled by varying the air to oxygen ratio in of the oxidant. In accordance with the systems and processes of the invention, a standard burner firing 1600 scfh of natural gas, from 0 to about 400 scfh of oxygen may be safely injected into the burner in conjunction with an appropriate air flow.

Figure 9:
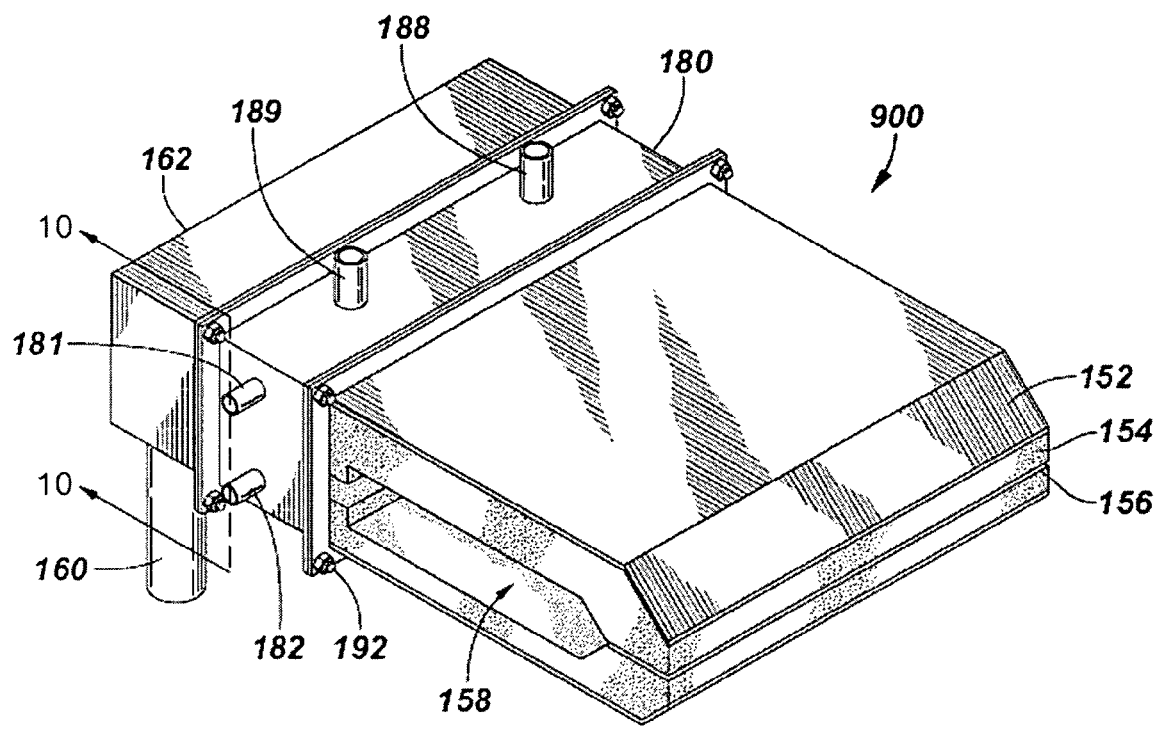
FIG. 9 is a perspective view of the fiberization burner of FIG. 6 modified to include a gas-cooled injector that may be used to inject secondary oxidant or, with modification, fuel.
Figure 10:
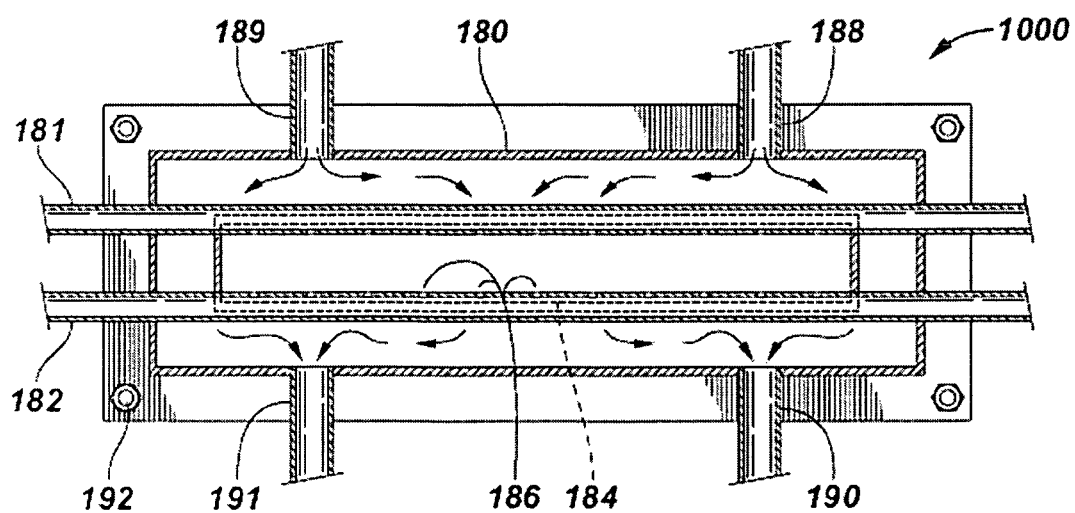
FIG. 10 is a cross-sectional view of the gas-cooled injector of FIG. 9 along 10-10.

FIG. 9 is a perspective view of the fiberization burner of FIG. 6 modified to include a gas-cooled injector that may be used to inject secondary oxidant or, with modification, fuel. FIG. 10 is a cross-sectional view of an injector 1000 useful in burner 900, taken along section 10-10 of FIG. 9. Burner 900 includes the metallic shell 152, refractory burner block 154, and 156, and air-fuel mix manifold 160 and 162 of prior art burner embodiment 150 of FIG. 6, and in addition includes an injector 1000 comprising a metallic rectangular outer tube 180 and a similar but smaller rectangular tube 184 positioned inside of outer rectangular tube 180, as illustrated in FIG. 10. Inner rectangular tube 180 and inner rectangular tube 184 define a volume through which a cooling gas may enter through inlets 188 and 189, and exit through outlets 190 and 191. Fuel or secondary oxidant may be injected through manifolds 181 and 182, which may be stainless steel or other alloy metal tubes. A plurality of holes 186 may be positioned uniformly near the bottom of tube 181 and top of tube 182 to inject fuel or secondary oxidant. Since tubes 181 and 182 are exposed to hot combustion gases, cooling is provided. Bolts or other fasteners 192 may be used to fasten injector 1200 in burner 1100. More or mess than two gas coolant inlets and outlets may be provided in other embodiments as desired, and these alternative embodiments are considered within the invention.

Figure 11:
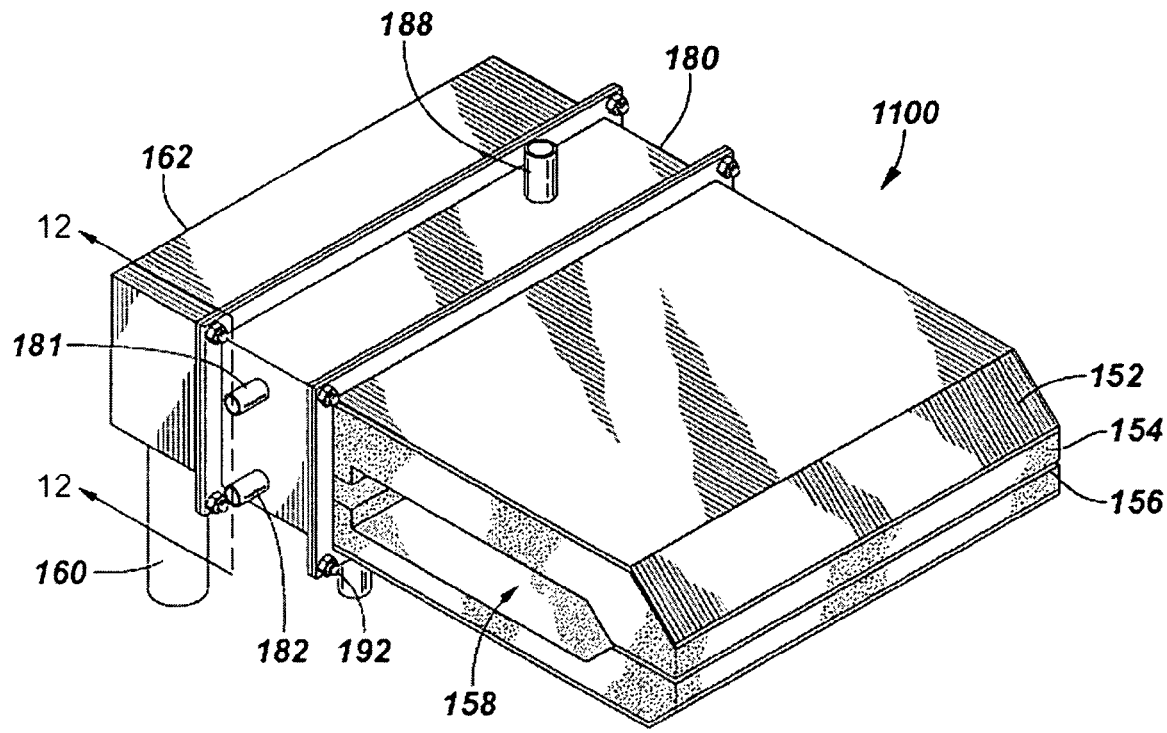
FIG. 11 is a perspective view of the fiberization burner of FIG. 6 modified to include a liquid-cooled injector that may be used to inject secondary oxidant or, with modification, fuel.
Figure 12:
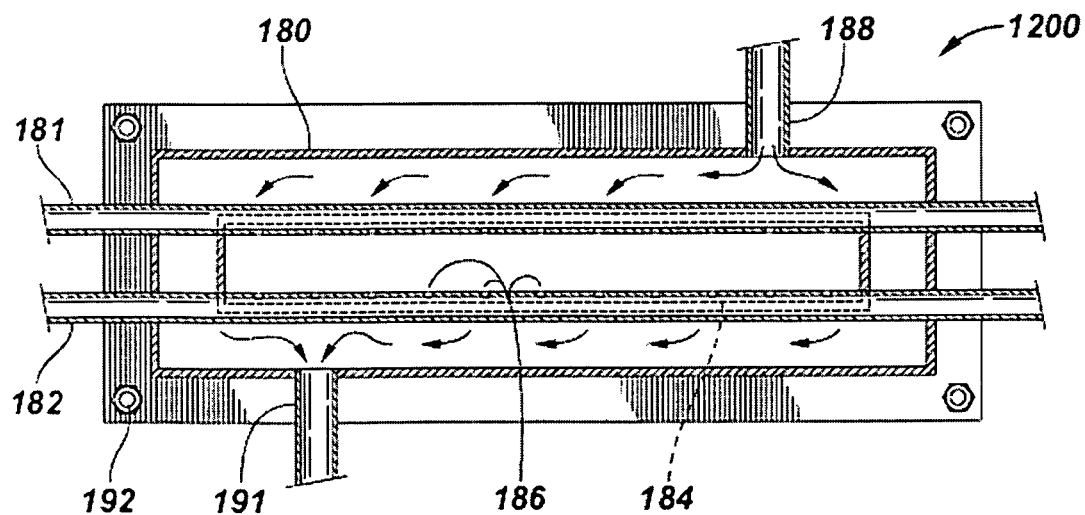
FIG. 12 is a cross-sectional view of the gas-cooled injector of FIG. 11 along 12-12.

FIG. 11 is a perspective view of the fiberization burner of FIG. 6 modified to include a liquid-cooled injector that may be used to inject secondary oxidant or, with modification, fuel. FIG. 12 a cross-sectional view of a liquid-cooled injector 1200 used in burner 1110, taken along section 12-12 of FIG. 11. Burner 1100 and injector 1200 are similar to burner 900 and gas-cooled injector 1000 of FIGS. 9 and 10, except that for liquid ingress and egress only one inlet and one outlet need be provided. Embodiments employing more than one liquid coolant inlet and more than one liquid coolant outlet are considered within the invention, but may not be necessary in all circumstances due to better cooling of the liquid.

Figure 13:
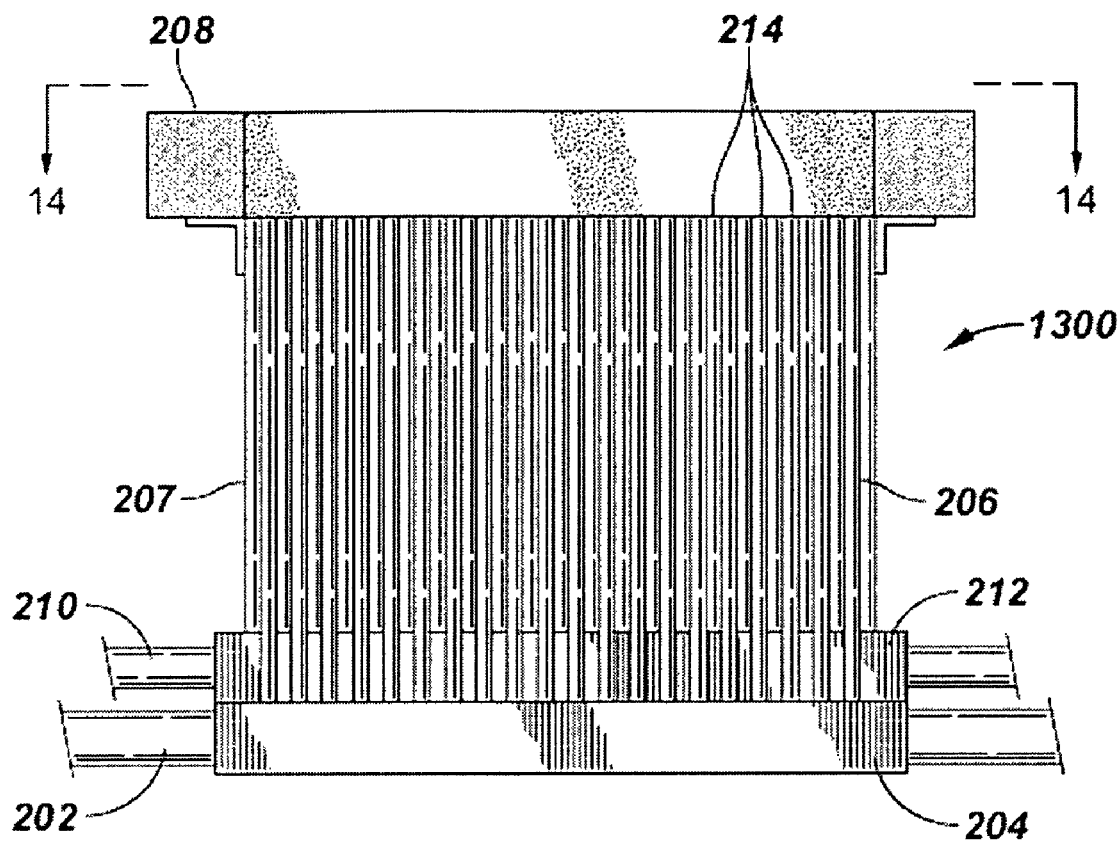
FIG. 13 is a plan view of a nozzle mix fuel/oxidant burner useful in the invention.
Figure 14:
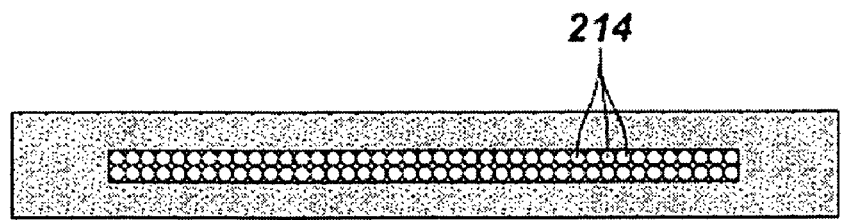
FIG. 14 is an end elevation view of the burner of FIG. 13 and FIG. 15 a schematic illustrating some dimensions of the burner of FIG. 13.
Figure 15:
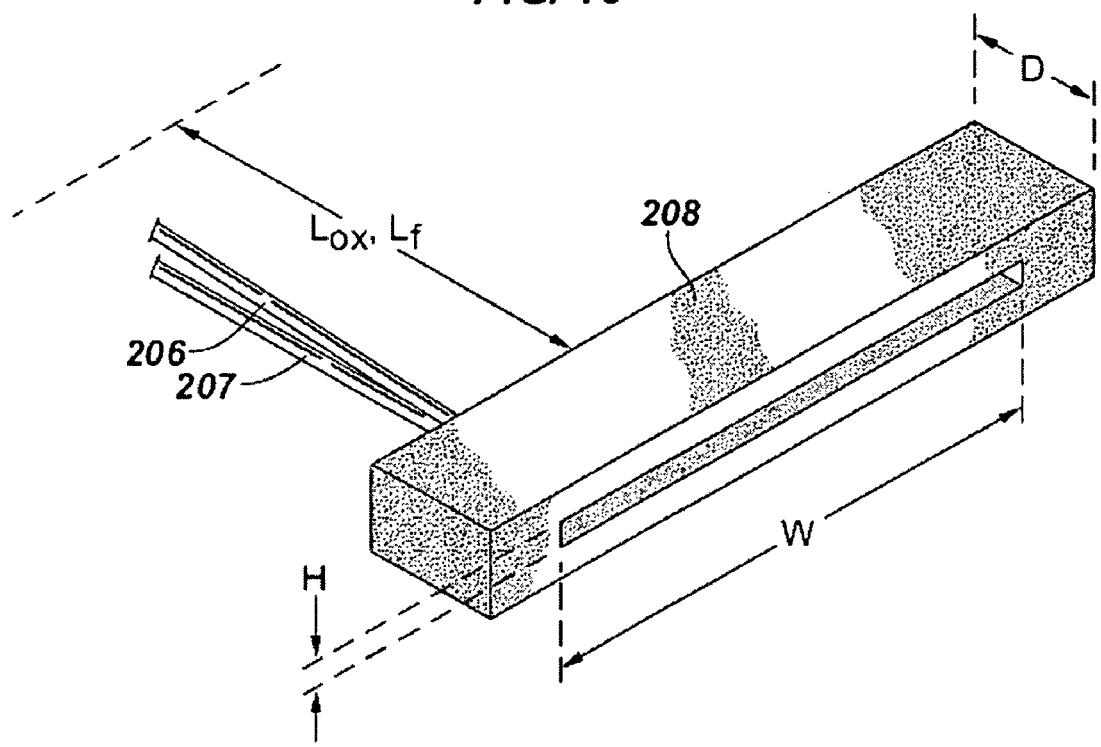

FIG. 13 is a plan view of a nozzle mix fuel/oxidant burner 1300 useful in the invention, and FIG. 14 is an end elevation view of the burner of FIG. 13. In burner 1300, oxygen-enriched oxidant and fuel are directed to flow through separate pluralities of tubes 206 and 207, respectively, ending in separate nozzles 214. An oxygen-enriched oxidant inlet 202 supplies a chamber or manifold 204 which then feed tubes 206. Similarly, fuel inlet 210 supplies a fuel chamber or manifold 212, which directs fuel through tubes 207. Fuel is then combusted at nozzles 214. The combustion product gases are directed through a chute defined by a refractory spacer 208, and then at the inorganic primary fibers for fiberization. The number of tubes oxidant 206 and fuel tubes 207 may vary widely, but generally the number of oxidant tubes ranges from about 50 to about 150, while the number of fuel tubes 207 may range from about 25 to about 75. The length of the tubes, $L_{OX}$ and $L_f$, may each range from about, 3 to about 10 inches, while the diameter may range from about 1/32 inch up to 0.5 inch. The spacing between tubes may be uniform and equal to about one tube diameter; alternatively the tubes may be arranged side-by-side. The fuel and oxidant inlets may be stainless steel or other alloy pipes. As may be seen in FIG. 15, this particular burner configuration provides a similar effect as a premix slot type burner in producing a wide, flat flame for fiberization. The width W of slot 156 may range from about 3 to about 36 inches, and the height of slot H may range from about 0.05 inch to about 1 inch. Depth D may range form about 0.5 to about 5 inches, depending on the support strength required.

Fiberization burners and injectors are an important aspect of the inventive processes and systems, and are claimed in applicant's co-pending patent application Ser. No. 11/314,436, filed concurrently herewith, some of the fiberization burner claims of which have issued as U.S. Pat. No. 7,581,948.

According to the present invention, the fuel and the oxidant are introduced in the burner either through separate tubes in the burner assembly, or are premixed. The term "fuel", according to this invention, means a combustible composition comprising a major portion of, for example, methane, natural gas, liquefied natural gas, propane, atomized oil or the like (either in gaseous or liquid form). Fuels useful in the invention may comprise minor amounts of non-fuels therein, including oxidants, for purposes such as premixing the fuel with the oxidant, or atomizing liquid fuels. The term "oxidant", according to the present invention, means a gas with an oxygen molar concentration of at least 50%. Such oxidants include oxygen-enriched air containing at least 50% vol., oxygen such as "industrially" pure oxygen (99.5%) produced by a cryogenic air separation plant or non-pure oxygen produced by e.g. a vacuum swing adsorption process or membrane permeation (about 90% vol. $O_2$ or more).

The total quantities of fuel and oxidant used by the combustion system are such that the flow of oxygen may range from about 0.9 to about 1.2 of the theoretical stoichiometric flow of oxygen necessary to obtain the complete combustion of the fuel flow. Another expression of this statement is that the combustion ratio is between 0.9 and 1.2.

The velocity of the fuel gas in the various burners depends on the burner geometry used, but generally is at least about 15 m/s. The upper limit of fuel velocity depends primarily on the desired attenuated fiber geometry and the geometry of the burner; if the fuel velocity is too low, the flame temperature may be too low, providing in adequate fiberization, which is not desired, and if the fuel flow is too high, flame might impinge on downstream equipment, or be wasted, which is also not desired.

Additionally, the invention also provides stabilization of the flame with an auxiliary injection of fuel and/or oxidant gases. Injection of the oxidant fluid may be made by premix of fuel and primary oxidant, usually air, and in addition secondary oxidant injection, using either a non-cooled injector, a gas-cooled injector, or a liquid—cooled injector, as explained in reference to the figures. When injecting secondary oxidant such as industrial oxygen in a gas-cooled or liquid-cooled burner, the hole diameter 186 (FIG. 10) or tube 176 diameter in a non-cooled injector (FIG. 8) maybe such that the secondary oxidant velocity does not exceed about 200 ft/sec at 400 scfh flow rate. The internal pressure of the burner should not exceed about 10 psig.

Systems and processes of the present invention are intended to be used, for example, to replace air-fuel combustion systems in already existing fiberization burners, and/or to be used as the main source of energy in new burners.

Suitable materials for the refractory block in the burners are fused zirconia ($ZrO_2$), fused cast AZS (alumina-zirconia-silica), rebonded AZS, or fused cast alumina ($Al_2O_3$). The choice of a particular material is dictated among other parameters by the chemistry and type of inorganic fibers to be produced.

In embodiments of the invention employing a heat transfer fluid, it is possible for the hot intermediate fluid to transfer heat to the oxidant or the fuel either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated by the present invention. Further, the intermediate fluid could be heated by the hot flue gases by either of the two mechanisms just mentioned.

In certain embodiments, the primary means for transferring heat comprises one or more heat exchangers selected from the group consisting of ceramic heat exchangers, known in the industry as ceramic recuperators, and metallic heat exchangers further referred to as metallic recuperators. Systems in accordance with the invention include those wherein the primary means for transferring heat are double shell radiation recuperators. Preheater means useful in the invention comprise heat exchangers selected from ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, there may be present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

In certain systems and processes in accordance with the invention, the hot intermediate fluid exchanges heat with the fuel and oxidant in parallel preheater means, in other words, hot intermediate fluid is split into two streams, one stream exchanging heat with the fuel in a first burner preheater means, the second stream exchanging heat with the oxidant in a second burner preheater means. Alternatively, for safety reasons, the intermediate fluid exchanges heat first with the oxidant in one or more oxidant preheaters, and then with the fuel in one or more fuel preheaters in series exchangers.

In other exemplary embodiments, the fuel path, oxidant path, and the hot intermediate fluid path may be defined by bores through a burner block as is known in the burner art.

When the intermediate fluid is air, and the oxidant for combustion is oxygen, the hot air can be advantageously used as the combustion oxidant by directing the hot air flow to the burners, when the oxygen supply is interrupted.

It must be understood from the description herein that the inventive systems and processes are not strictly limited to embodiments wherein the fuel and oxidant are heat exchanged with an intermediate fluid at the same temperature of the intermediate fluid. In some embodiments, it is preferred to contact the hot intermediate fluid first with the oxidant, creating an intermediate fluid having a lower temperature, and subsequently exchanging heat of this lower temperature intermediate fluid with the fuel. Also, as stated previously, in certain embodiments, it is contemplated that the hot intermediate fluid could be mixed with the oxidant, the fuel or both.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A process comprising:
   (a) providing a molten inorganic fiberizable material;
   (b) forming one or more substantially vertical primary fibers from the molten material;
   (c) attenuating the one or more substantially vertical primary fibers using a flame of an oxy-fuel fiberization burner, wherein a fuel is at least partially combusted with a primary oxidant in an internal combustion chamber defined by a refractory burner block of the burner;
   (d) routing a secondary oxidant into the combustion chamber through a plurality of tubes extending through the refractory burner block at positions intermediate a fuel and primary oxidant entrance end and a flame exit end of the burner; and
   (e) preheating one or more of the primary oxidant, the secondary oxidant, and the fuel prior to entering the burner.

2. The process of claim 1 comprising forming a composition comprising combustion gases, aspirated air and inorganic fibers, and separating substantially all of the inorganic fibers from the composition to form an effluent gas stream.

3. The process of claim 2 wherein the preheating comprises exchanging heat with at least a portion of the effluent gas stream.

4. The process of claim 3 wherein the preheating comprises exchanging heat with at least a portion of the composition.

5. The process of claim 2 comprising compressing the primary oxidant prior to combusting the fuel in the burner.

6. The process of claim 5 wherein the primary oxidant is air and the process comprises preheating at least a portion of the air by exchanging heat with at least a portion of burner combustion gases prior to compressing the air.

7. The process of claim 5 comprising injecting a portion of the secondary oxidant into the primary oxidant after compressing the primary oxidant.

8. The process of claim 2 wherein the secondary oxidant is preheated by heat exchange with at least a portion of the effluent gas stream.

9. The process of claim 2 wherein the preheating comprises exchanging heat between at least a portion of the composition and a heat transfer fluid to form a heated heat transfer fluid, and exchanging heat between the heated heat transfer fluid and the fuel and/or the primary oxidant.

10. The process of claim 2 wherein the preheating comprises exchanging heat between at least a portion of the effluent gas stream and a heat transfer fluid to form a heated heat transfer fluid, and exchanging heat between the heated heat transfer fluid and the fuel and/or primary oxidant.

11. The process of claim 1 wherein the primary oxidant and the fuel are premixed prior to being combusted in the burner.

12. The process of claim 1 wherein the primary oxidant and the fuel are mixed in situ in the burner.

13. The process of claim 1 wherein the secondary oxidant is industrial grade oxygen.

14. The process of claim 1 comprising compressing the primary oxidant prior to combusting the fuel in the burner.

15. The process of claim 14 wherein the primary oxidant is air and the process comprises preheating at least a portion of the air by exchanging heat with at least a portion of a composition comprising combustion gases, aspirated air and inorganic fibers prior to compressing the air.

16. The process of claim 15 comprising injecting a portion of the secondary oxidant into the primary oxidant after compressing the primary oxidant.

17. The process of claim 1 wherein a portion of the secondary oxidant is mixed with the primary oxidant to form a tertiary oxidant prior to combustion of the fuel in the burner.

18. The process of claim 17 comprising preheating the tertiary oxidant and optionally the fuel prior to combusting of the fuel with tertiary oxidant.

19. The process of claim 1 comprising lancing of the flame formed by the burner with a portion of the secondary oxidant.

20. The process of claim 1 comprising controlling burner flame temperature by monitoring one or more parameters selected from the group consisting of velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, pressure of the primary oxidant entering the burner, humidity of the primary oxidant, burner geometry, oxidation ratio, and combinations thereof.

* * * * *